United States Patent
Cadalen et al.

(10) Patent No.: US 11,583,821 B2
(45) Date of Patent: Feb. 21, 2023

(54) DEVICE FOR MEASURING THE INNER TEMPERATURE OF A REFORMING TUBE

(71) Applicant: L'Air Liquide, Société Anonyme pour l'Etude et l'Exploitation des Procédés Georges Claude, Paris (FR)

(72) Inventors: Sébastien Cadalen, Paris (FR); Daniel Gary, Montigny le Bretonneux (FR); Laurent Prost, Gif sur Yvette (FR)

(73) Assignee: L'Air Liquide, Sociâté Anonyme pour l'Etude et l'Exploitation des Procédés Georges Claude, Paris (FR)

(*) Notice: Subject to any disclaimer, the term of this patent is extended or adjusted under 35 U.S.C. 154(b) by 274 days.

(21) Appl. No.: 16/772,337

(22) PCT Filed: Dec. 3, 2018

(86) PCT No.: PCT/FR2018/053074
§ 371 (c)(1),
(2) Date: Jun. 12, 2020

(87) PCT Pub. No.: WO2019/115906
PCT Pub. Date: Jun. 20, 2019

(65) Prior Publication Data
US 2021/0077971 A1    Mar. 18, 2021

(30) Foreign Application Priority Data
Dec. 14, 2017  (FR) ..................... 1762156

(51) Int. Cl.
*B01J 19/00* (2006.01)
*B01J 19/24* (2006.01)
(Continued)

(52) U.S. Cl.
CPC ....... *B01J 19/0013* (2013.01); *B01J 19/2415* (2013.01); *C01B 3/34* (2013.01);
(Continued)

(58) Field of Classification Search
CPC ..... B01J 19/0013; B01J 19/2415; C01B 3/34; C01B 2203/1619; G01K 1/14; G01K 7/04
See application file for complete search history.

(56) References Cited

U.S. PATENT DOCUMENTS 2,148,706 A * 2/1939 Morrow ................. G01K 1/10
                                                    136/231
3,172,832 A * 3/1965 Dreyer et al. .......... B01J 19/02
                                                    208/147
(Continued)

FOREIGN PATENT DOCUMENTS

CN   105498653 A *  4/2016
CN   112129422 A * 12/2020
(Continued)

OTHER PUBLICATIONS

International Search Report for corresponding PCT/FR2018/053074, dated Feb. 5, 2019.

*Primary Examiner* — Matthew J Merkling
(74) *Attorney, Agent, or Firm* — Elwood L. Haynes

(57) ABSTRACT

A device for measuring the internal temperature of a reforming tube including a first structure having an axial part of tubular shape positioned in the lengthwise direction of a reforming tube and a radial part projecting radially towards the central axis of the reforming tube, a second structure of oblong shape having at least one thermocouple made of welded Nicrosil/Nisil conductors arranged longitudinally against the axial part and radially against the radial part, and an outer sheath enveloping the first structure and the second structure.

11 Claims, 4 Drawing Sheets

(51) Int. Cl.
*C01B 3/34* (2006.01)
*G01K 1/14* (2021.01)
*G01K 7/04* (2006.01)

(52) U.S. Cl.
CPC ............... *G01K 1/14* (2013.01); *G01K 7/04* (2013.01); *B01J 2219/00063* (2013.01); *C01B 2203/1619* (2013.01)

(56) References Cited

U.S. PATENT DOCUMENTS

| | | | |
|---|---|---|---|
| 3,656,914 A * | 4/1972 | Friedrichsen | ........ B01J 19/0053 374/163 |
| 3,955,419 A * | 5/1976 | Barton | ................... G01K 1/026 374/E1.005 |
| 5,192,132 A | 3/1993 | Pelensky | |
| 2007/0116090 A1 | 5/2007 | Park et al. | |
| 2013/0177122 A1* | 7/2013 | Fushimi | ............... G21C 17/035 376/247 |

FOREIGN PATENT DOCUMENTS

| | | | |
|---|---|---|---|
| KR | 101388229 B1 * | 4/2014 | ......... B01J 19/0013 |
| WO | WO 2011 012875 | 2/2011 | |

\* cited by examiner

DEVICE FOR MEASURING THE INNER TEMPERATURE OF A REFORMING TUBE

CROSS REFERENCE TO RELATED APPLICATIONS

This application is a 371 of International Application No. PCT/FR2018/053074, filed Dec. 3, 2018, which claims priority to French Patent Application No. 1762156, filed Dec. 14, 2017, the entire contents of which are incorporated herein by reference.

BACKGROUND

The present invention relates to a device for measuring the internal temperature of a reforming tube and to the reforming tube comprising same.

Steam methane reforming (SMR) furnaces are used for producing hydrogen, carbon monoxide and syngas. The reactions for cracking the hydrocarbon feedstock are endothermic and require a great deal of heat.

The SMR furnace is a parallelepipedal construction produced with structural elements and walls made of ceramic bricks, having heat sources, generally rows of burners, installed vertically along the lateral walls (side-fired technology), horizontally along the roof or the bottom of the furnace (top-fired and bottom-fired technology respectively). Rows of catalytic tubes are arranged in the furnace. The cracking reactions take place in these catalytic tubes which are dimension in terms of length, in terms of diameter and in terms of thickness to allow the reactions to be completed with a desired process efficiency close to thermodynamic equilibrium. These cylindrical tubes have uniform dimensions and a uniform shape (typically measuring 12 m in height, 10 cm in internal diameter and with a thickness of the order of 1 to 1.5 cm) but have a limited capacity for heat transfer. The transfer of heat is one of the limiting steps in the method. Evaluating the heat transfer along the entire length of the reforming tube is not easy, but it can be estimated using simulation tools.

The precision of the results given by simulation is dependent on a number of parameters that are fed into the model. Knowledge of the profile of the actual temperature in the catalytic tubes contributes to the validation of the model. In order to improve the precision of the results it is important to be able to measure this temperature profile. Measuring the temperature on the external skin of the tube is possible; this temperature can be obtained for example using a pyrometer or an IR camera having a wavelength of, for example, 3.1 µm, or by welding contact thermocouples at various elevations along the tube. Internal measurement is tricky. In addition, the tubes are filled with catalyst which generally takes the form for example of pellets pierced with the numerous holes and with diameters close to 15-20 mm, which constitute a haphazard heap of solid particles within the tube. The number of pellets to the diameter is, according to the dimensions given hereinabove, limited to around 5 solid particles, but this number may vary according to the dimension of the pellets used. The instrumentation used to measure this internal temperature needs to be not very bulky, in order not to disturb the flows in the tube, and needs to be able to withstand the temperature and atmospheric conditions. In addition, there is a steep thermal gradient between the inlet (>450° C.) and the outlet (950° C.) of the tube. The gradient profile between these two points is non-linear because, owing to the endothermic reaction that takes place in the tube and the limited transfer of heat between the external and internal skin thereof, this profile passes through a minimum which, depending on the operating conditions and the type of furnace, may drop as low as 450° C. in the first three meters.

On that basis, one problem that arises is that of providing an improved means for continuously measuring the internal temperature of the reforming tubes.

SUMMARY

The solution of the present invention is a device for measuring the internal temperature of a reforming tube 1 comprising:

a first structure 2 made up of at least a part 2a of tubular shape positioned in the lengthwise direction of the tube and of an expansion 2b of this part of tubular shape projecting radially towards the central axis 3 of the reforming tube, at least a second structure 4 of oblong shape comprising at least one thermocouple made of welded Nicrosil/Nisil conductors arranged longitudinally against the tubular-shaped part of the first structure and radially against the expansion of the first structure, and an outer sheath 5 enveloping the first and second structure. As a preference, the outer sheath is made of an electrically insulating material.

Remember, that nicrosil is an alloy containing nickel, chrome (14%) and silicon (1.5%) and nisi) is an alloy containing nickel, silicon (4.5%) and magnesium (0.1%). The Nicrosil/Nisil thermocouple is highly stable, and resistant to temperature and temperature variations.

Furthermore, note that what is meant by "expansion projecting radially" is an expansion projecting in the direction of the central axis or approximately in the direction of the central axis of the reforming tube. As a preference, the expansion of the first structure projects radially, forming a T.

The diameter of the tubular-shaped part of the first structure will, for example, have a diameter comprised between 6 and 10 mm for a reforming tube having an internal diameter comprised between 100 and 120 mm. As a preference, a ratio comprised between 5% and 15%, more preferably comprised between 5% and 10% will be applied to the ratio of the diameter of the tubular shape of the first structure to the internal diameter of the reforming tube. Note that the diameter of the tubular-shaped part will also be dependent on the number of thermocouples of the second structure.

The expansion of the first structure may have the same diameter as the tubular-shaped part.

As the case may be, the measurement device according to the invention may exhibit one or more of the following features:

the conductors are welded at a tip 6 situated at the end of the expansion.

said device comprises a structure in the form of an arc of a circle reinforcing the retention of the device against the internal wall of the reforming tube.

the second structure is tied 7 to the first structure.

the first structure comprises at least a first and a second expansion projecting radially toward the central axis of the reforming tube and situated at different heights on the tube, the second structure comprises at least a first and a second thermocouple made of welded Nicrosil/Nisil conductors positioned radially against, respectively, the first and second expansions of the first structure and longitudinally against the tubular-shaped part of the first structure.

the remaining space between the outer sheath, the first structure and the second structure is filled with a solder 8, preferably a silver solder. Specifically, the solder will be compatible with the pressure and temperature conditions and the composition of the gas.

the upper end of the first structure is plugged.

said measurement device is made up of a single unit or of several units joined together.

Another subject of the present invention is a reforming tube comprising a device for measuring the internal temperature of a reforming tube as defined in the invention and placed against the internal wall of the reforming tube.

The measuring device is held against the internal wall of the reforming tube using the circular arc and then by heaping the catalytic charge.

Note that the fact of placing the temperature measuring device against the internal wall of the reactor makes it possible to minimize the disturbance to the charging of the reforming tube and then during the flow of the fluids.

As the case may be, the reforming tube according to the invention may exhibit one or more of the following features:

said reforming tube has at its upper end a blanking plate 9 and the temperature measuring device is installed through this blanking plate. In other words, part of the measuring device with its sheath emerges from the blanking plate said measuring device is connected to conventional data acquisition and storage means.

the end of the expansion of the first structure of the measuring device is situated at a distance of between 2 and 5 mm from the central axis of the reforming tube.

Note too that the inlet plate of the reforming tube is provided with a pipe that carries the gaseous mixture that is to be reformed and that the outlet is equipped with a means for collecting syngas.

The present invention will now be described in greater detail.

Each thermocouple will be sheathed by a metal jacket, preferably a jacket made of Inconel, which will contain the pair of conductors. The number of thermocouples will depend on the number of measurements to be taken. Specifically, each thermocouple tip (spot of welding between the two conductors) will be at a unique location along the reforming tube so as to form a plurality of conducting pairs supplying temperature indications at unique longitudinal locations.

The thermocouples will be arranged longitudinally against the tubular-shaped part of the first structure and radially against the expansion of the first structure projecting radially toward the central axis of the reforming tube. The device will have various altitudes of expansion. These expansions will be made up for example of a hollow half-tube of small diameter (this diameter will be 2 to 4 times greater than that of the thermocouple). It will act as a shield to protect the thermocouple during the filling of the tube and will also serve as a support for attaching the thermocouples which will be positioned underneath these half-tubes.

Each thermocouple is tied longitudinally to the tubular part of the first structure and radially to the expansion. Preferentially, the tying will be achieved using wires or bands compatible with the operating conditions. The nature of these ties will preferably be that they are made of Inconel.

Care will also be taken to ensure that the thermocouple tip is not in contact with the expansion, so that the measurement will be representative of the gas, and to achieve that, a bead of ceramic may be inserted and encircle the end of the thermocouple.

The diameter of the tubular-shaped part of the first structure will be determined according to the number of thermocouples to be fitted. The expansions of the first structure will be welded to the tubular-shaped part at different altitudes in order to obtain the temperature profile of the tube.

The device may be offered as:

a single-piece part, but its length greater than or equal to 10 m might give rise to size constraints during transport and/or installation; or several units or sections. The various sections will then be butted together during installation using a connecting sleeve allowing them to be joined together.

The positioning of the device will be reinforced by the fitting, at various altitudes, of circular arcs made of metal, preferentially of Inconel. These reinforcers will make the assembly more rigid and ensure that the device is held in position during the charging of the reforming tube with the catalyst and more particularly will ensure that the thermocouple remains positioned within the heart of the catalytic bed.

The device will pass through the blanking plate at the upper end of the reforming tube. The upper end of the first structure of the device will be plugged. The base of the external sheath will be welded to the blanking plate of the reforming tube. The remaining space between the external sheath and the first structure (which means to say the space not occupied by the second structure) is filled with a solder compatible with the pressure and temperature conditions and the composition of the gas, for example a silver solder, so as to seal the system. During operation, the reforming tube is under pressure (for example 30 bar) under temperature (in excess of 450° C.) and contains a combustible atmosphere. Specifically, the atmosphere is generally rich in CH4, CO and H2.

The sealing of the device is of capital importance: because of the flammable and toxic nature of the gaseous mixture present in the tubes, leaks are unacceptable. This device will be extended beyond the blanking plate, which is at 250-300° C., in order to remove the zone that is to be sealed to a zone that is not as hot and not as restrictive in terms of the choice of solder. The plurality of thermocouples will emerge from this zone. The ends of the conductors will be brought together into an ATEX box (namely a box compatible with an explosive atmosphere) provided for that purpose, to gather the signals and amplify them as needs be in order to send them to an acquisition system which may be situated in a control room.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1A:
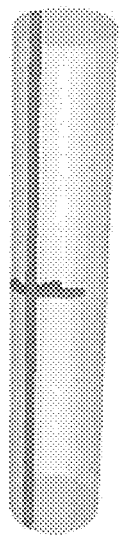
FIG. 1*a* illustrates the positioning of the temperature measuring device within the reforming tube, in accordance with one embodiment of the present invention.

FIG. 1a shows the positioning of the temperature measuring device within the reforming tube. The device is pressed against the internal skin of the reforming tube and the circular-arc-shaped structure is there to ensure that it is held in position, notably while the tube is being filled with the catalyst.

Figure 1B:
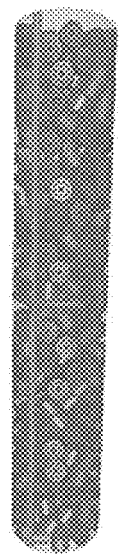
FIG. 1*b* illustrates the overall structure of the temperature measuring device, in accordance with one embodiment of the present invention.

FIG. 1b shows how the heap is created around the device. Specifically, the device is supposed to measure the temperature of the gas in the catalytic bed without interfering with the heaping as this could lead to local temperature increases or cause fluidic phenomena around the thermocouple which would then lead to a biased measurement not representative of the physical reality. This result is obtained by simulation using the DigiPac software.

Figure 2:
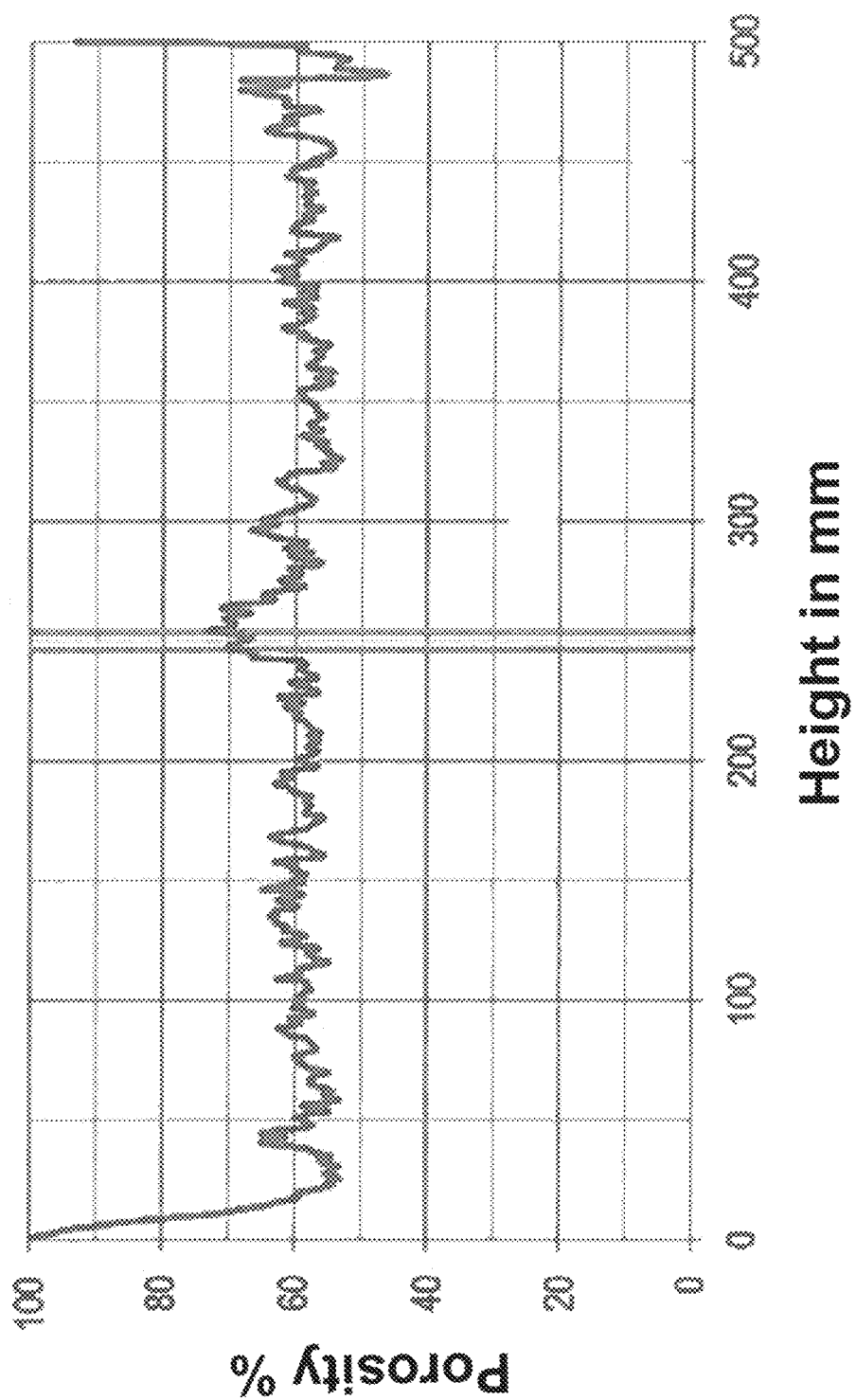
FIG. 2 illustrates a profile of porosity along the tube, averaged over the cross section of the tube, in accordance with one embodiment of the present invention.

Empty zones that would encourage preferred circulation of gas are observed around the device. However, it has been demonstrated that the risk of creating hotspots is modest, even with larger voids. FIG. 2 shows a profile of porosity along the tube, averaged over the cross section of the tube. Here, the expansion is situated at the altitude z=250 mm (z=0 being taken to be at the height of the bottom of the furnace). The disruption contributes to locally increasing the porosity by around 10%. This perturbed zone is located at the level of the expansion and below the expansion. With regard to the variations in porosity arising out of the random nature of the heaping (+1-5%), this porosity defect will not be able to generate undesirable effects that might introduce error into the temperature measurement. In other words, it is possible to consider that the heaping of the catalysts in the reforming tube comprising the temperature measuring device according to the invention is correct.

Figure 3:
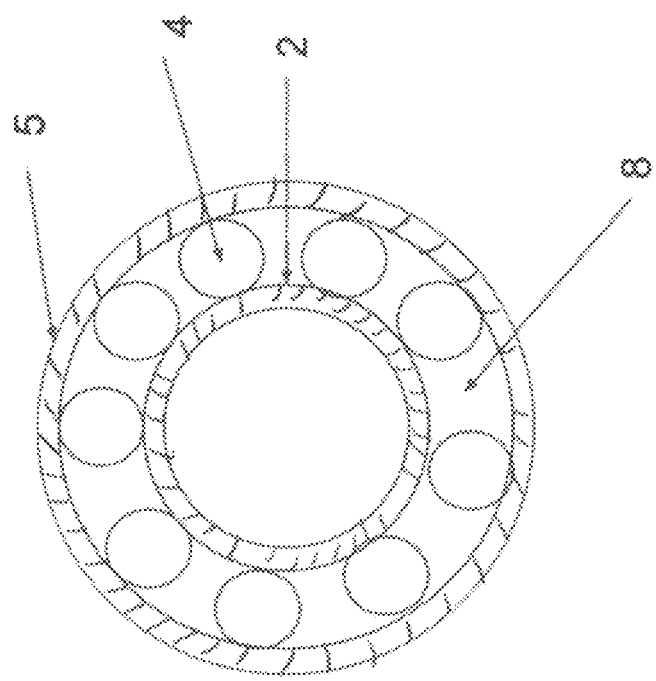
FIG. 3 illustrates a view of the temperature measuring device from above, in accordance with one embodiment of the present invention.

FIG. 3 shows a view of the temperature measuring device from above.

Figure 4:
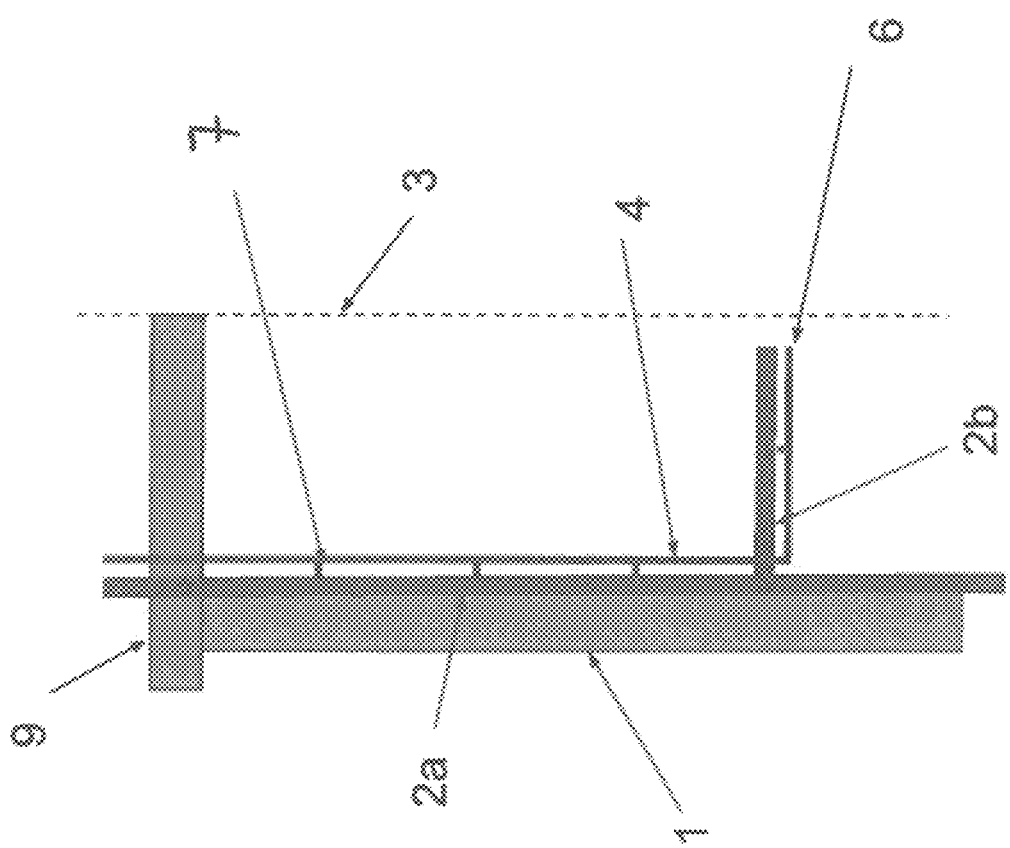
FIG. 4 illustrates a schematic side view of the reforming tube with the measuring device, in accordance with one embodiment of the present invention.

FIG. 4 is a schematic side view of the reforming tube with the measuring device. For better visibility, the outer sheath has not been depicted and only a portion of the reforming tube has been depicted. There are depicted:
the reforming tube
the first structure 2 made up of at least a part 2a of tubular shape positioned in the lengthwise direction of the tube and of an expansion 2b of this part of tubular-shaped part projecting radially towards the central axis 3 of the reforming tube,
the second structure 4 of oblong shape comprising at least one thermocouple made of welded Nicrosil/Nisil conductors arranged longitudinally against the tubular-shaped part of the first structure and radially against the expansion of the first structure,
the ties 7
the tip 6 at which the conductors are welded, and
the reforming tube blanking plate 9.

Note that the expansion of the first structure may be holed in order to allow the thermocouple to pass through.

The invention claimed is:

1. A device for measuring the internal temperature of a reforming tube comprising:
a first structure comprising an axial part of tubular shape positioned in the lengthwise direction of a reforming tube and at least one radial part projecting radially towards the central axis of the reforming tube,
a second structure comprising at least one thermocouple made of welded Nicrosil/Nisil conductors arranged longitudinally against the axial part and parallel with the radial part, and
an outer sheath enveloping the first structure and the second structure, wherein the second structure is tied to the first structure.

2. The device of claim 1, wherein the Nicrosil/Nisil conductors are welded at a tip situated at the end of the radial part.

3. The device of claim 1, further comprising a reinforcing structure in the form of an arc of a circle reinforcing the retention of the device against the internal wall of the reforming tube.

4. The device of claim 1, wherein
the at least one radial part of the first structure further comprises at least a first radial part and a second radial part, wherein the first radial part and the second radial part are situated at different heights on the tube,
the at least one thermocouple of the second structure comprises at least a first thermocouple and a second thermocouple made of welded Nicrosil/Nisil conductors positioned parallel with, respectively, the first radial part and the second radial part and longitudinally against the axial part.

5. A device for measuring the internal temperature of a reforming tube comprising:
a first structure comprising an axial part of tubular shape positioned in the lengthwise direction of a reforming tube and at least one radial part projecting radially towards the central axis of the reforming tube,
a second structure comprising at least one thermocouple made of welded Nicrosil/Nisil conductors arranged longitudinally against the axial part and parallel with the radial part, and
an outer sheath enveloping the first structure and the second structure,
wherein a remaining space between the outer sheath, the first structure and the second structure is filled with a solder.

6. A device for measuring the internal temperature of a reforming tube comprising:
a first structure comprising an axial part of tubular shape positioned in the lengthwise direction of a reforming tube and at least one radial part projecting radially towards the central axis of the reforming tube,
a second structure comprising at least one thermocouple made of welded Nicrosil/Nisil conductors arranged longitudinally against the axial part and parallel with the radial part, and
an outer sheath enveloping the first structure and the second structure,
wherein the first structure has an upper end, and wherein the upper end of the first structure is plugged.

7. The device of claim 1, wherein the device for measuring the internal temperature of a reforming tube comprises a single unit or of several units joined together.

8. A reforming tube comprising a device for measuring the internal temperature of a reforming tube as claimed in claim 1, wherein the device is placed against an internal wall of the reforming tube.

9. The reforming tube of claim 8, wherein the reforming tube has an upper end comprising a blanking plate and the device for measuring the internal temperature of a reforming tube is installed through the blanking plate.

10. The reforming of claim 9, wherein the measuring device is connected to conventional data acquisition and storage means.

11. The reforming tube of claim 8, wherein the end of the radial part is situated at a distance of between 2 and 5 mm from the central axis of the reforming tube.

* * * * *